(12) United States Patent
Matsen et al.

(10) Patent No.: US 8,884,201 B2
(45) Date of Patent: Nov. 11, 2014

(54) SYSTEMS AND METHODS FOR FABRICATION OF THERMOPLASTIC COMPONENTS

(75) Inventors: Marc R. Matsen, Seattle, WA (US); Mark A. Negley, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1625 days.

(21) Appl. No.: 12/210,650

(22) Filed: Sep. 15, 2008

(65) Prior Publication Data

US 2010/0065552 A1    Mar. 18, 2010

(51) Int. Cl.
*H05B 6/04* (2006.01)
*H05B 6/02* (2006.01)
(Continued)

(52) U.S. Cl.
CPC .......... *F03D 1/065* (2013.01); *F05B 2280/4007* (2013.01); *B29C 65/3644* (2013.01); *B29L 2031/082* (2013.01); *B29C 66/721* (2013.01); *B29C 65/18* (2013.01); *B29K 2307/02* (2013.01); *B29C 65/32* (2013.01); *B29L 2031/7504* (2013.01); *B29C 65/3676* (2013.01); *B29K 2105/06* (2013.01); *F05B 2230/00* (2013.01); *B29C 65/3668* (2013.01); *B29C 65/36* (2013.01); *Y02E 10/721* (2013.01); *B29C 35/0805* (2013.01); *F05C 2225/08* (2013.01); *B29K 2305/00* (2013.01); *B29K 2071/00* (2013.01); *B29C 66/80* (2013.01); *B29K 2307/00* (2013.01); *B29C 2035/0811* (2013.01); *B29K 2101/12* (2013.01); *B29C 65/368* (2013.01); *B29C 35/0272* (2013.01)
USPC .......... 219/671; 219/604; 219/602; 219/600; 219/10.73; 219/624; 264/430; 264/433

(58) Field of Classification Search
CPC ................. B29C 2035/0811; B29C 35/0272; B29C 35/0805; B29C 65/18; B29C 65/32; B29C 65/36; B29C 65/3644; B29C 65/3668; B29C 65/3676; B29C 65/3681
USPC .......... 219/671, 604, 602, 600, 10.73, 10.41, 219/10.491, 624, 630, 634, 635, 660; 422/64, 68.1, 82.12, 104, 284, 287, 422/290; 228/157, 265; 148/520, 570, 571; 72/62, 342.96, 54, 60, 38, 709, 342; 156/273, 272.4, 380.2; 264/431, 433
See application file for complete search history.

(56) References Cited

U.S. PATENT DOCUMENTS 2,902,572 A * 9/1959 Lackner et al. ............... 219/645
5,308,946 A * 5/1994 Mohr .............................. 219/645
(Continued)

OTHER PUBLICATIONS

International Search Report and Written Opinion of PCT/US2009/056962; Aug. 5, 2010; 14 pages.

*Primary Examiner* — Dana Ross
*Assistant Examiner* — Ket D Dang
(74) *Attorney, Agent, or Firm* — Armstrong Teasdale LLP (57) ABSTRACT

A method of fabricating a thermoplastic component using inductive heating is described. The method includes positioning a plurality of induction heating coils to define a process area for the thermoplastic component, wherein the plurality of induction heating coils comprises a first set of coils and a second set of coils. The method also includes controlling a supply of electricity provided to the plurality of inductive heating coils to intermittently activate the coils. The intermittent activation is configured to facilitate prevention of electromagnetic interference between adjacent coils.

13 Claims, 7 Drawing Sheets

(51) Int. Cl.
  *B29C 65/36* (2006.01)
  *B29C 35/08* (2006.01)
  *F03D 1/06* (2006.01)
  *B29C 35/02* (2006.01)
  *B29L 31/08* (2006.01)
  *B29C 65/00* (2006.01)
  *B29C 65/18* (2006.01)
  *B29K 307/02* (2006.01)
  *B29C 65/32* (2006.01)
  *B29L 31/00* (2006.01)
  *B29K 105/06* (2006.01)
  *B29K 305/00* (2006.01)
  *B29K 71/00* (2006.01)
  *B29K 307/00* (2006.01)
  *B29K 101/12* (2006.01)

(56) References Cited

U.S. PATENT DOCUMENTS

| | | | |
|---|---|---|---|
| 5,323,951 A * | 6/1994 | Takechi et al. | 228/102 |
| 5,510,600 A * | 4/1996 | Jackson | 219/645 |
| 5,591,369 A | 1/1997 | Matsen et al. | |
| 5,591,370 A | 1/1997 | Matsen et al. | |
| 5,645,744 A | 7/1997 | Matsen et al. | |
| 5,645,747 A | 7/1997 | Matsen et al. | |
| 5,728,309 A | 3/1998 | Matsen et al. | |
| 6,091,063 A * | 7/2000 | Woods | 219/645 |
| 6,323,468 B1 | 11/2001 | Dabelstein et al. | |
| 6,528,771 B1 | 3/2003 | Matsen et al. | |
| 6,582,659 B1 * | 6/2003 | Murata | 422/64 |
| 6,977,362 B2 * | 12/2005 | Ohishi et al. | 219/662 |
| 6,979,807 B2 | 12/2005 | Anderson et al. | |
| 7,102,112 B2 | 9/2006 | Anderson et al. | |
| 7,109,451 B2 | 9/2006 | Brown et al. | |
| 2008/0128078 A1 * | 6/2008 | May et al. | 156/272.4 |

* cited by examiner

SYSTEMS AND METHODS FOR FABRICATION OF THERMOPLASTIC COMPONENTS

BACKGROUND

The technical field relates generally to the fabrication of thermoplastic components, and more specifically to the heating of thermoplastic components during fabrication.

Typically, tooling in autoclave or hot press processing is a significant heat sink that consumes substantial energy. Furthermore, the tooling may require significant time to heat the composite material to its consolidation temperature and, after processing the composite, to cool to a temperature at which it is safe to remove the finished composite part. Furthermore, even distribution of heat applied to the tooling and the composite material may be difficult, especially when manufacturing a large component.

Fabrication of thermoplastic components may include induction heating. Typically, dies or tooling for induction processing are ceramic because ceramic is not susceptible to induction heating and, preferably, is a thermal insulator (i.e., a relatively poor conductor of heat). Cast ceramic tools cost less to fabricate than metal tools of comparable size and have less thermal mass than metal tooling because they are unaffected by the induction field. Because the ceramic tooling is not susceptible to induction heating, it is possible to embed induction heating elements in the ceramic tooling and to heat the composite or metal retort without significantly heating the tools. Thus, induction heating can reduce the time required and energy consumed to fabricate a part.

While graphite or boron fibers can be heated directly by induction, most organic matrix composites require a susceptor in, or adjacent to, the composite material preform to achieve the necessary heating for consolidation or forming. The susceptor is heated inductively and transfers its heat principally through conduction to the preform or work piece. Enclosed in the metal retort, the work piece does not experience the oscillating magnetic field resulting from the induction process. The field is instead absorbed in the retort sheets. Heating is by conduction from the retort to the work piece.

Induction focuses heating on the retort (and work piece) and eliminates wasteful, inefficient heat sinks (e.g., tooling of conventional processes). Induction heating facilitates a reduction in the difference between the coefficients of thermal expansion of the tools and the work piece. Furthermore, this process is energy efficient because significantly higher percentages of the input energy go to heating the work piece than occurs with conventional presses. The reduced thermal mass and ability to focus the heating energy permits the operating temperature to be changed rapidly. Finally, the shop environment is not heated as significantly from the radiation of the large thermal mass of a conventional press, and is a safer and more pleasant environment for the press operators.

Fabrication of thermoplastic components may also include thermoplastic welding. Thermoplastic welding, which can eliminate mechanical fasteners, features the ability to join thermoplastic composite components at high speeds with minimum touch labor and little, if any, pretreatments.

Large scale parts such as wing spars and ribs, and the wing skins that are bonded to the spars and ribs, and/or fuselage sections and support structure may be typically on the order of twenty to thirty feet long, and potentially can be hundreds of feet in length when the process is perfected for commercial transport aircraft. Parts of this size are difficult to produce with perfect flatness. Instead, the typical part may have various combinations of inconsistencies beyond design tolerance. Applying heat to the interface by electrically heating the susceptor in connection with pressure on the parts tends to flatten the inconsistencies, but the time needed to achieve full intimate contact with the use of heat and pressure may be excessive, and can lead to undesirable results.

An existing solution for increasing the rate of production of thermoplastic components is to build more autoclaves and rate tooling when a critical rate of the current tools is reached, or to cap the production capabilities of a manufacturing facility at a certain rate that does not require building new tooling. The existing autoclave based systems have an inherent limit at which production rates above that critical rate will trigger a large increment of capital expenditures to be incurred along with a lag time required to obtain the capital, install the equipment, and ensure the equipment is functional.

Accordingly, there is a need for an apparatus and a system that facilitates rapid fabrication of large thermoplastic components, as well as a related method.

SUMMARY

In one aspect, a method of fabricating a thermoplastic component using inductive heating is provided. The method includes positioning a plurality of induction heating coils to define a process area for the thermoplastic component, wherein the plurality of induction heating coils comprises a first set of coils and a second set of coils. The method also includes controlling a supply of electricity provided to the plurality of inductive heating coils to intermittently activate the coils. The intermittent activation is configured to facilitate prevention of electromagnetic interference between adjacent coils.

In another aspect, an inductive heating apparatus for fabricating a thermoplastic component is provided. The apparatus includes a first set of induction coils and a second set of induction coils. The first and second sets of induction coils are positioned to define a process area for the thermoplastic component, wherein individual coils of the first set of induction coils alternate with individual coils of the second set of induction coils along a length of the process area. The apparatus also includes a first power supply and a second power supply. The first power supply is coupled to the first set of induction coils, and the second power supply is coupled to the second set of induction coils. Furthermore, the first and second power supplies are configured to alternatively supply electricity to the first set of induction coils and the second set of induction coils.

In yet another aspect, a system for fabricating a thermoplastic component using induction heating is provided. The system includes a thermoplastic composite preform and a susceptor. The system also includes a first set of induction coils and a second set of induction coils positioned adjacent to the thermoplastic preform. Individual coils of the first set of induction coils are positioned to alternate with individual coils of the second set of induction coils to define a thermoplastic component process area. The system also includes a first power supply and a second power supply. The first power supply is coupled to the first set of induction coils, and the second power supply coupled to the second set of induction coils. The first and second power supplies are configured to alternately power the first set of induction coils and the second set of induction coils.

In yet another aspect, a method for fabricating a thermoplastic component using inductive heating is provided. The method is for use in aircraft manufacturing. The method includes positioning at least a first set of coils and a second set of coils to define a process area for the thermoplastic component. The coils of the first set of coils and coils of the second set of coils alternate along a length of the process area. The method also includes configuring a first power supply to provide electricity to coils of the first set of coils and configuring a second power supply to provide electricity to coils of the second set of coils. The first power supply is configured to provide electricity to coils of the first set of coils when the second power supply is not providing electricity to coils of the second set of coils, and the second power supply is configured to provide electricity to coils of the second set of coils when the first power supply is not providing electricity to coils of the first set of coils.

In yet another aspect, an inductive heating apparatus for fabricating thermoplastic aircraft components is provided. The apparatus includes a first set of induction coils made up of a plurality of individual coil segments that include at least one winding and a coil element. The first set of induction coils are coupled to a first power supply. The apparatus also includes a second set of induction coils made up of a plurality of individual coil segments that include at least one winding and a coil element. The first and the second set of induction coils are positioned to define a process area for the thermoplastic component. The coils of the first set of induction coils and the coils of the second set of induction coils alternate along a length of the process area. The second set of induction coils is coupled to a second power supply. The first power supply is configured to provide the first set of induction coils with electricity for a predetermined period of time while the second power supply is not supplying electricity to the second set of induction coils. Also, the second power supply is configured to provide the second set of induction coils with electricity for a predetermined period of time when the first power supply is not providing electricity to the first set of induction coils.

Accordingly, there is a need for an apparatus and a system that facilitates rapid fabrication of large thermoplastic components, as well as a related method.

DETAILED DESCRIPTION

In a known embodiment, induction heating for consolidating and/or forming organic matrix composite materials includes placing a thermoplastic organic matrix composite preform within a metal susceptor envelope (i.e., a retort). The thermoplastic organic matrix may be, but is not limited to, a polyarylether-ether-ketone (PEEK) matrix material, or from a family of polymide thermoplastic resins known as Ultem® (Ultem is a trademark of SABIC Innovative Plastics IP BV). The susceptor facesheets of the retort are inductively heated to heat the preform. A consolidation and forming pressure may be applied to consolidate and, if applicable, to form the preform at its consolidation temperature. If desired, the sealed susceptor sheets form a pressure zone. The pressure zone may be evacuated in the retort in a manner analogous to conventional vacuum bag processes for resin consolidation or, for low volatiles resins, like Ultem, the pressure zone can be pressurized to enhance consolidation. The retort is placed in an induction heating press on the forming surfaces of dies having the desired shape of the molded composite part. After the retort, the preform may be inductively heated to the desired elevated temperature and a differential pressure may be applied (while maintaining the vacuum in the pressure zone around the preform) across the retort. The retort functions as a diaphragm in the press to form the preform against the die and into the desired shape.

A variety of manufacturing operations may be performed in an induction heating press. Each operation may have an optimum operating temperature. By way of example, and in a way not meant to limit the scope of the disclosure, optimum operating temperatures provided to the preform by the induction heating press may range from about 350° F. (175° C.) to about 1950° F. (1066° C.). For each operation, the temperature usually needs to be held relatively constant for several minutes to several hours while the operations are completed. While temperature control can be achieved by controlling the input power fed to the induction coil, a Curie temperature of the susceptor material can be used to control the temperature applied to the preform. Proper selection of the metal or alloy in the retort's susceptor facesheets facilitates avoiding excessive heating of the work piece irrespective of the input power. Improved control and temperature uniformity in the work piece facilitates consistent production of work pieces. The Curie temperature phenomenon is used to control the absolute temperature of the work piece, and to obtain substantial thermal uniformity in the work piece, by matching the Curie temperature of the susceptor to the desired temperature of the induction heating operation being performed.

Rapid heating of an entire weld area during the processing of a thermoplastic component would facilitate increased efficiency of thermoplastic component production. Rapid heating results in quick melting of the entire surface of the joint to be welded. The components being joined are then brought together and joined, which facilitates reducing fit-up issues and allows squeeze out to bring the entire structure into a dimensionally accurate condition.

However, to process a large thermoplastic composite component, large induction heating coils, of a size large enough to process the thermoplastic composite component, or multiple induction heating coils positioned to define a process area large enough to process the component, high voltage levels are required that may not be practical. To lower the voltage demand, electromagnetic fields may be supplied to the work piece using a plurality of smaller heating coils, and by supplying power to those coils using a plurality of power supplies.

Figure 1:
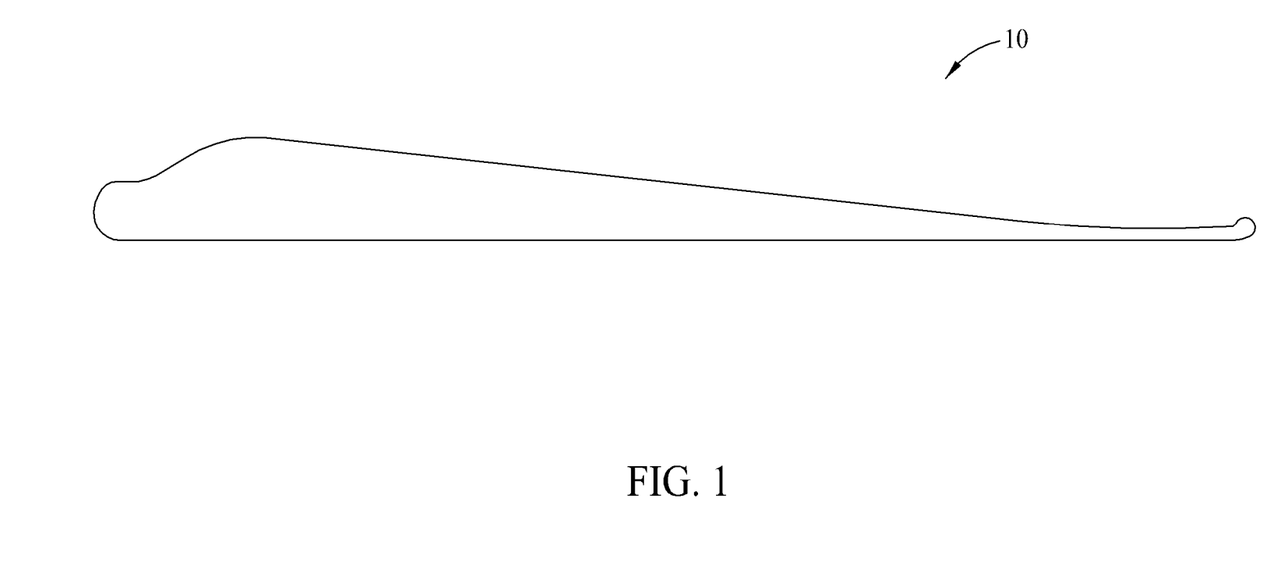
FIG. 1 is an illustration of an exemplary wind turbine blade.

FIG. 1 is an illustration of an exemplary wind turbine blade 10. Typical wind turbine blades 10 may extend to over forty meters in length. The methods and systems described herein may be used to fabricate wind turbine blade 10, as well as any thermoplastic component. Large aircraft components may also be fabricated from thermoplastic materials. For example, but not limited to, thermoplastic wings, fuselage sections, doors, control surfaces, and empennage sections are desirable. Due to demand, as well as to ensure efficient production, it is desirable to produce thermoplastic components at a high rate. There is additional emphasis on the use of thermoplastic materials in high rate production components due to the recycling capability of thermoplastic materials.

Figure 2:
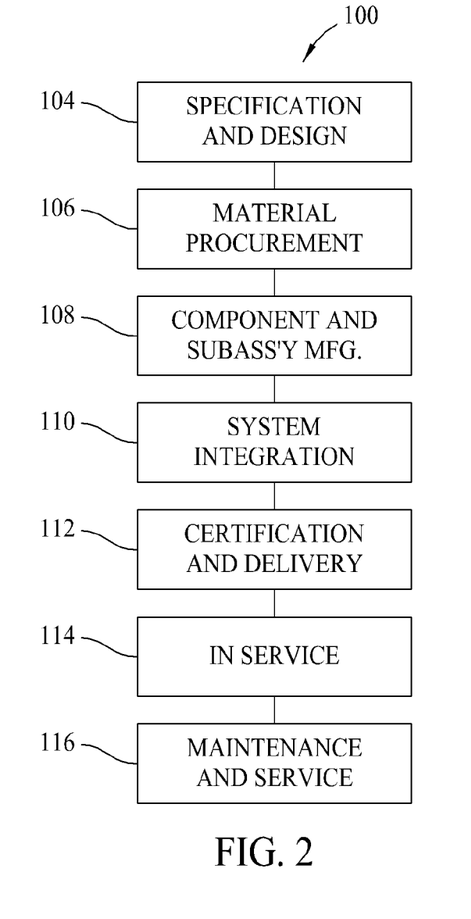
FIG. 2 is a flow diagram of aircraft production and service methodology.
Figure 3:
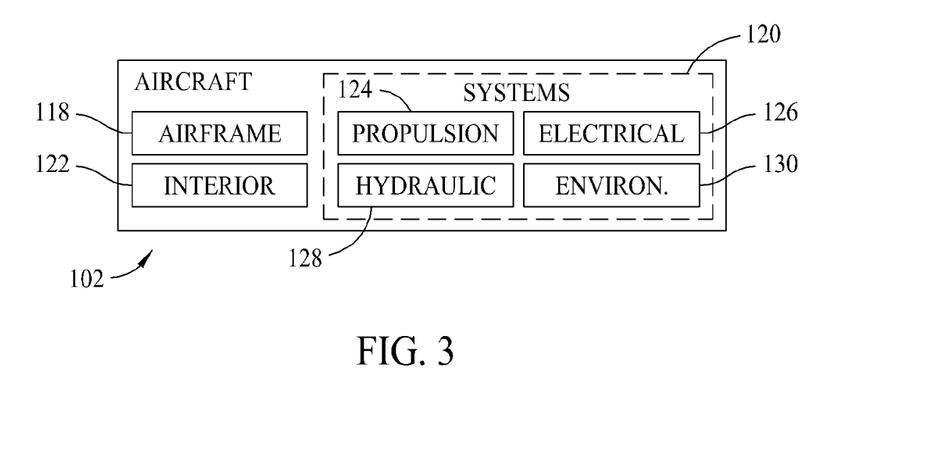
FIG. 3 is a block diagram of an aircraft.

Referring more particularly to the drawings, embodiments of the disclosure may be described in the context of an aircraft manufacturing and service method 100 as shown in FIG. 2 and an aircraft 102 as shown in FIG. 3. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 3, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the methods and systems described herein may be applied to other industries, such as the automotive industry.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus embodiments, method embodiments, or a combination thereof may be utilized during the production stages 108 and 110, for example, by substantially expediting assembly of or reducing the cost of an aircraft 102. Similarly, one or more of apparatus embodiments, method embodiments, or a combination thereof may be utilized while the aircraft 102 is in service, for example and without limitation, to maintenance and service 116.

Figure 4:
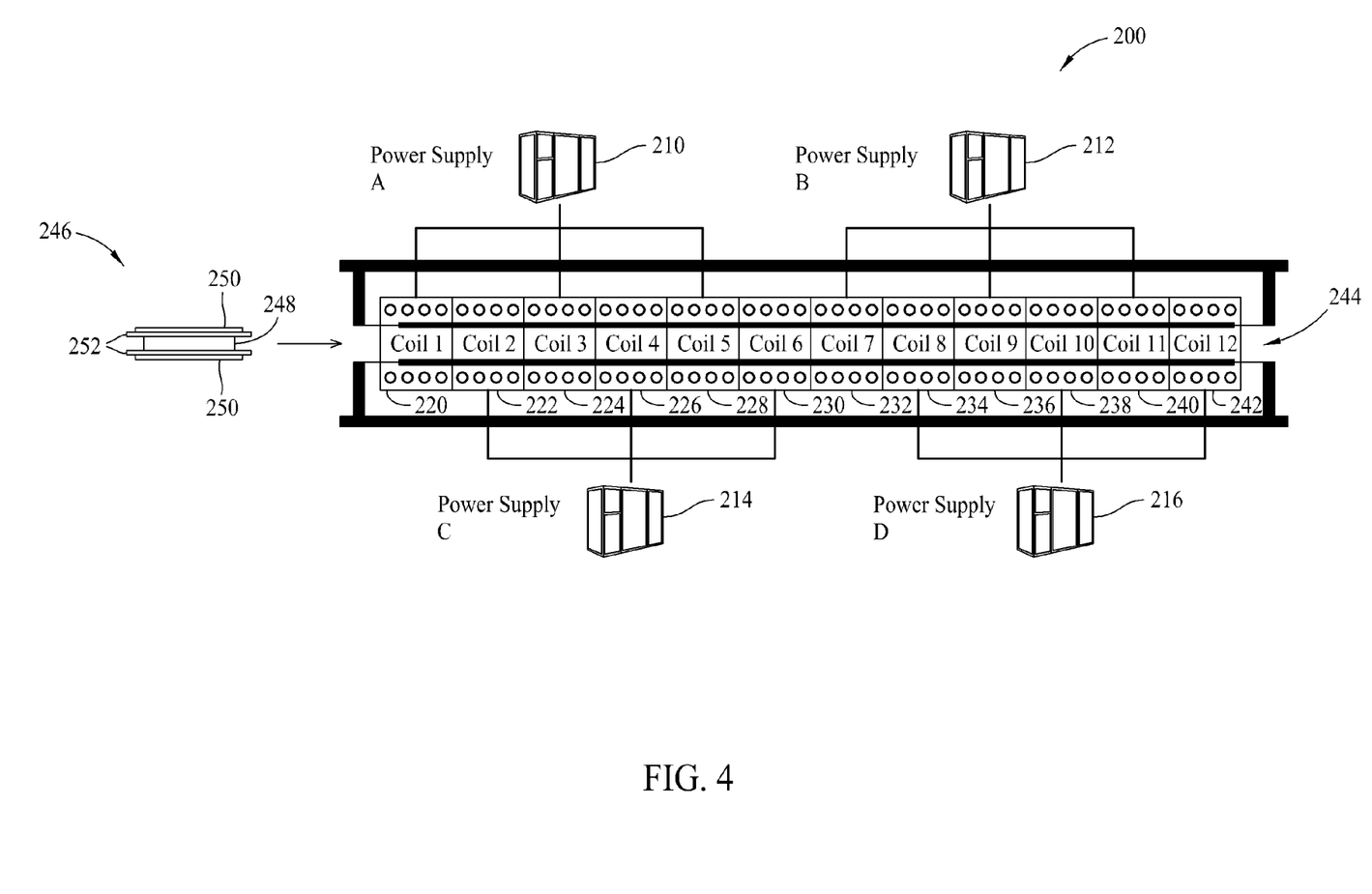
FIG. 4 is a diagram of an exemplary system for production of thermoplastic components using induction heating.

FIG. 4 is an exemplary embodiment of a system 200 for induction processing of a composite material. In the exemplary embodiment, system 200 includes a first power supply 210, a second power supply 212, a third power supply 214, and a fourth power supply 216. In the exemplary embodiment, system 200 also includes a plurality of individual induction heating coils, such as, a first coil 220, a second coil 222, a third coil 224, a fourth coil 226, a fifth coil 228, a sixth coil 230, a seventh coil 232, an eighth coil 234, a ninth coil 236, a tenth coil 238, an eleventh coil 240, and a twelfth coil 242. Each of coils 220, 222, 224, 226, 228, 230, 232, 234, 236, 238, 240, and 242 include at least one winding and a coil element (not shown in FIG. 4). Coils 220, 222, 224, 226, 228, 230, 232, 234, 236, 238, 240, and 242 are positioned to define a process area 244. A work piece 246 placed within process area 244 is provided with electromagnetic fields that facilitate inductive heating of the work piece 246. In the exemplary embodiment, the work piece 246 includes a thermoplastic material 248 and a tool 250. In some embodiments, the tool 250 is cast from, for example, fused silica. In some examples, fused silica tooling may be formed from Thermo-Sil® Castable 120, available from Thermo Materials Corporation of Linden, N.J.

In some embodiments, tool 250 may also be a laminated tool typically made up of layers of, for example, austenitic stainless steel. Also, in some embodiments, tool 250 includes a susceptor 252, for example, a metal susceptor. Susceptor 252 may also be embedded within thermoplastic material 248. Although specifically described herein as including twelve induction heating coils and four power supplies, system 200 may include any number of induction heating coils and any number of power supplies that facilitate system 200 functioning as described herein.

In the exemplary embodiment, first power supply 210 is coupled to, and configured to control a supply of electricity provided to, first coil 220, third coil 224, and fifth coil 228. Similarly, second power supply 212 is coupled to, and configured to control a supply of electricity provided to, seventh coil 232, ninth coil 236, and eleventh coil 240. In the exemplary embodiment, third power supply 214 is coupled to, and configured to control a supply of electricity provided to, second coil 222, fourth coil 226, and sixth coil 230. Similarly, fourth power supply 216 is coupled to, and configured to control a supply of electricity provided to, eighth coil 234, tenth coil 238, and twelfth coil 242.

The use of multiple power supplies 210, 212, 214, and 216 facilitates even heating of a large work piece, for example, work piece 246, without the impractically high voltages that would be required from a single power supply to power a single coil large enough to heat work piece 246 or to power multiple coils that define a process area (e.g., process area 244) large enough to heat work piece 246. In some exemplary embodiments, work piece 246 is greater than forty meters in length.

Figure 5:
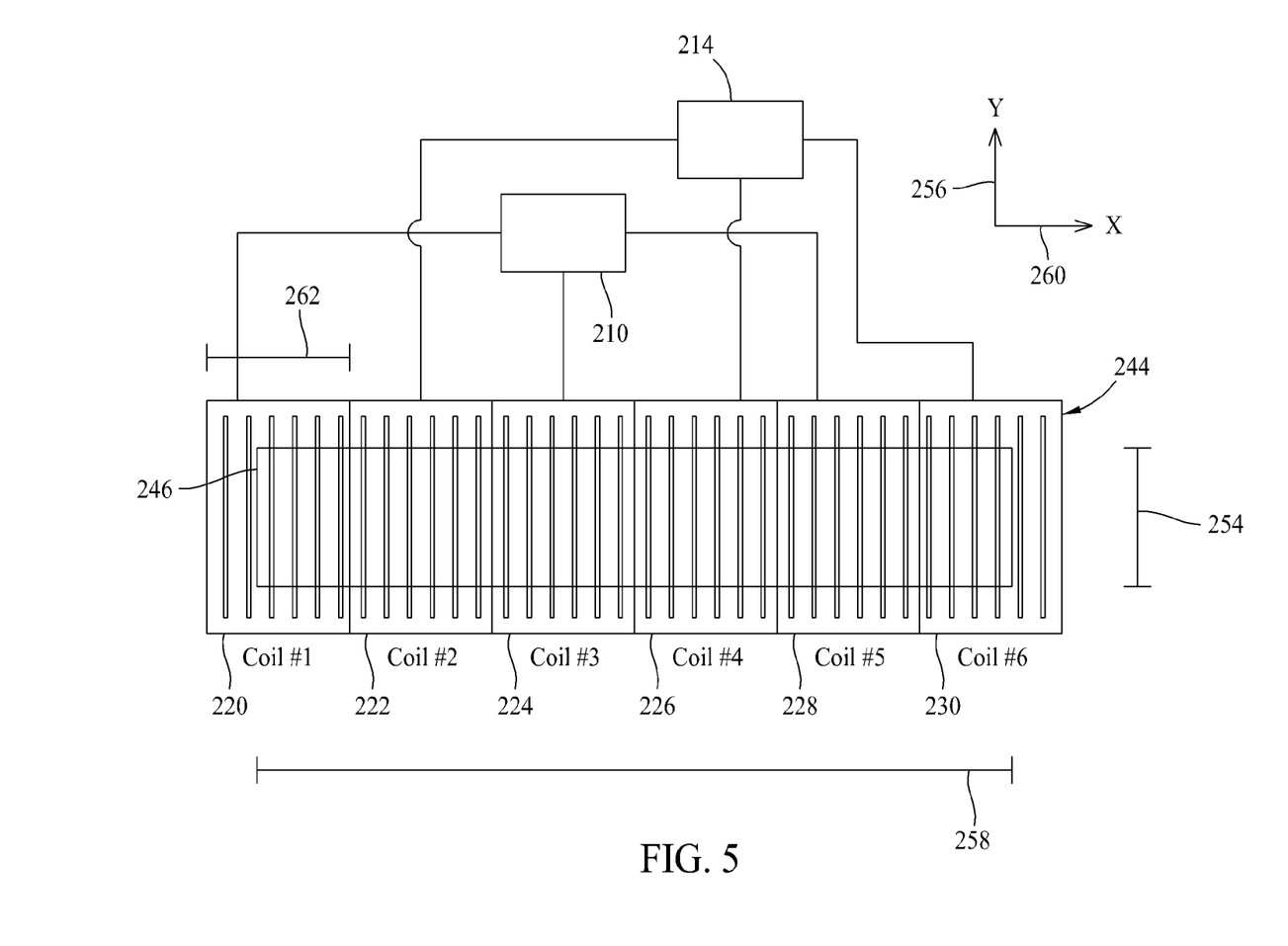
FIG. 5 is a block diagram of a work piece positioned within a process area.

FIG. 5 is a block diagram of work piece 246 positioned within process area 244. As described above, process area 244 is defined by multiple coils, for example, coils 220, 222, 224, 226, 228, and 230. Sizes of coils 220, 222, 224, 226, 228, and 230 are dependent upon factors such as, but not limited to, a frequency of AC current oscillation, a number of coil turns, a plan form dimension of the coil, a process temperature, and a resistivity of susceptor 252. In the exemplary embodiment, the frequency of AC current oscillation is in the range of 500 Hz to 5000 Hz.

In at least one example, work piece 246 has a width 254 of four feet in a y-direction 256 and a length 258 of sixteen feet in an x-direction 260. Six coils 220, 222, 224, 226, 228, and 230, each have a width 262 of three feet and are oriented to define an eighteen foot long process area 244. In the example of FIG. 5, first power supply 210 and third power supply 214 supply electricity to coils 220, 222, 224, 226, 228, and 230. Since each of coils 220, 222, 224, 226, 228, and 230 provide approximately twelve square feet of coverage along process area 244, and each of power supplies 210 and 214 supply three coils with electricity, each of power supplies 210 and 214 provides thirty-six square feet of coverage along process area 244. In the exemplary embodiment, the area of work piece 246 heated by each individual power supply is kept to a predetermined number. In the example above, the area heated by each individual power supply is kept to thirty-six square feet per power supply. More specifically, to heat a different sized work piece 246, the dimensions of coils 220, 222, 224, 226, 228, and 230 may be changed. For example, to heat work piece 246 having width 254 of eight feet and length 258 of sixteen feet, twelve coils (not shown in FIG. 5, however, aligned in the same manner as coils 220, 222, 224, 226, 228, and 230) each having width 262 of one and a half feet are oriented to define a sixteen feet long process area 244. Four power supplies (not shown in FIG. 5) are used to provide electricity to the twelve coils. The dimensions of the coils are selected to maintain the predetermined heating area per power supply while configuring system 200 to heat a different sized work piece 246.

However, by way of non-limiting example, if first coil 220 is supplied with electricity having a different phase than the electricity supplied to second coil 222, electromagnetic fields (shown in FIG. 5) produced by first coil 220 may interfere with electromagnetic fields (shown in FIG. 6) produced by second coil 222. More specifically, if supplied with electricity having different phases, electromagnetic fields (shown in FIG. 5) produced by first coil 220 may cancel electromagnetic fields (shown in FIG. 6) produced by second coil 222, resulting in uneven heating of the work piece. In other words, individual coils 220, 222, 224, 226, 228, 230, 232, 234, 236, 238, 240, and 242 positioned adjacent to one another may produce suboptimal heating of the work piece due to electromagnetic interference.

Figure 6:
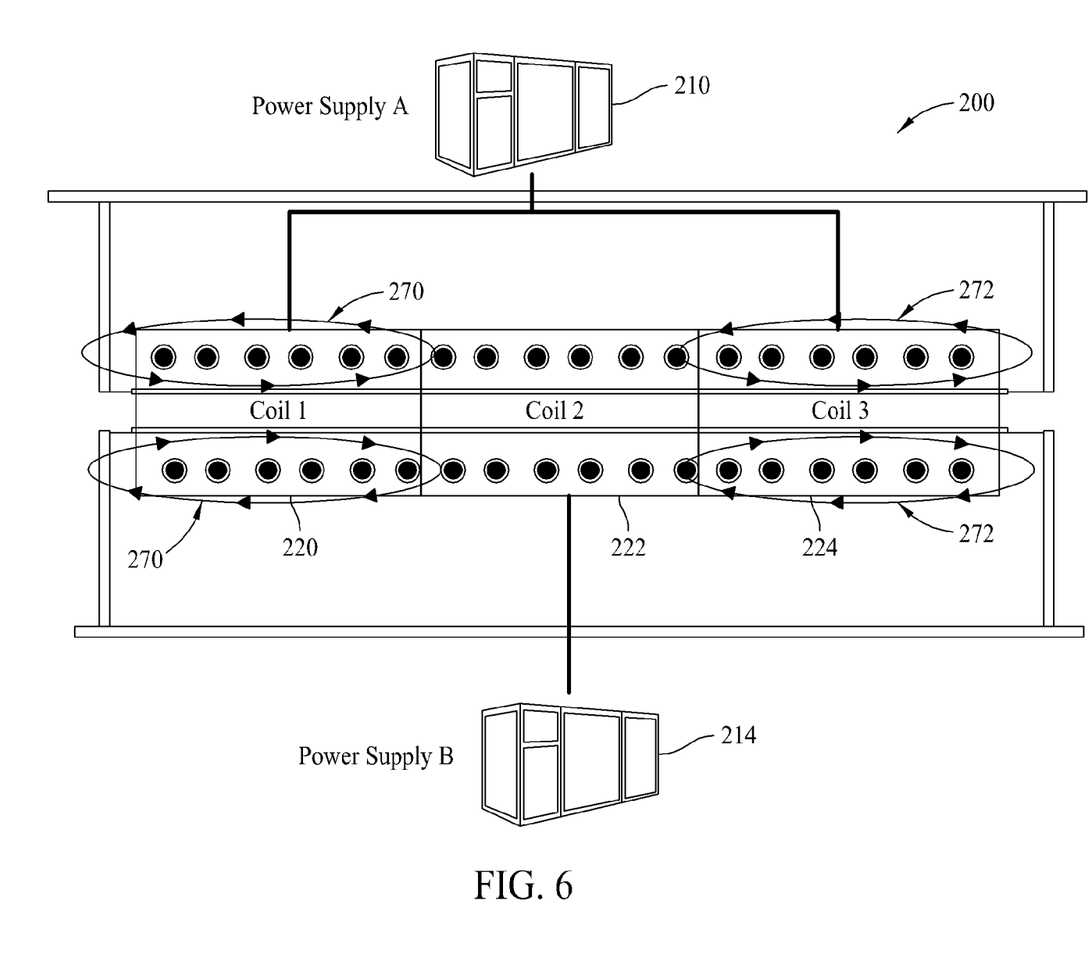
FIG. 6 is an expanded diagram of a portion of the exemplary embodiment of the system shown in FIG. 4.

FIG. 6 is an expanded diagram of a portion of the exemplary embodiment of system 200 shown in FIG. 4. As shown in FIG. 4, system 200 includes first coil 220, second coil 222, and third coil 224. First coil 220 and third coil 224 are coupled to first power supply 210. Third coil 224 is coupled to third power supply 214. Electromagnetic fields 270 and 272 are produced by first coil 220 and third coil 224, respectively, when first coil 220 and third coil 224 are energized by first power supply 210.

Figure 7:
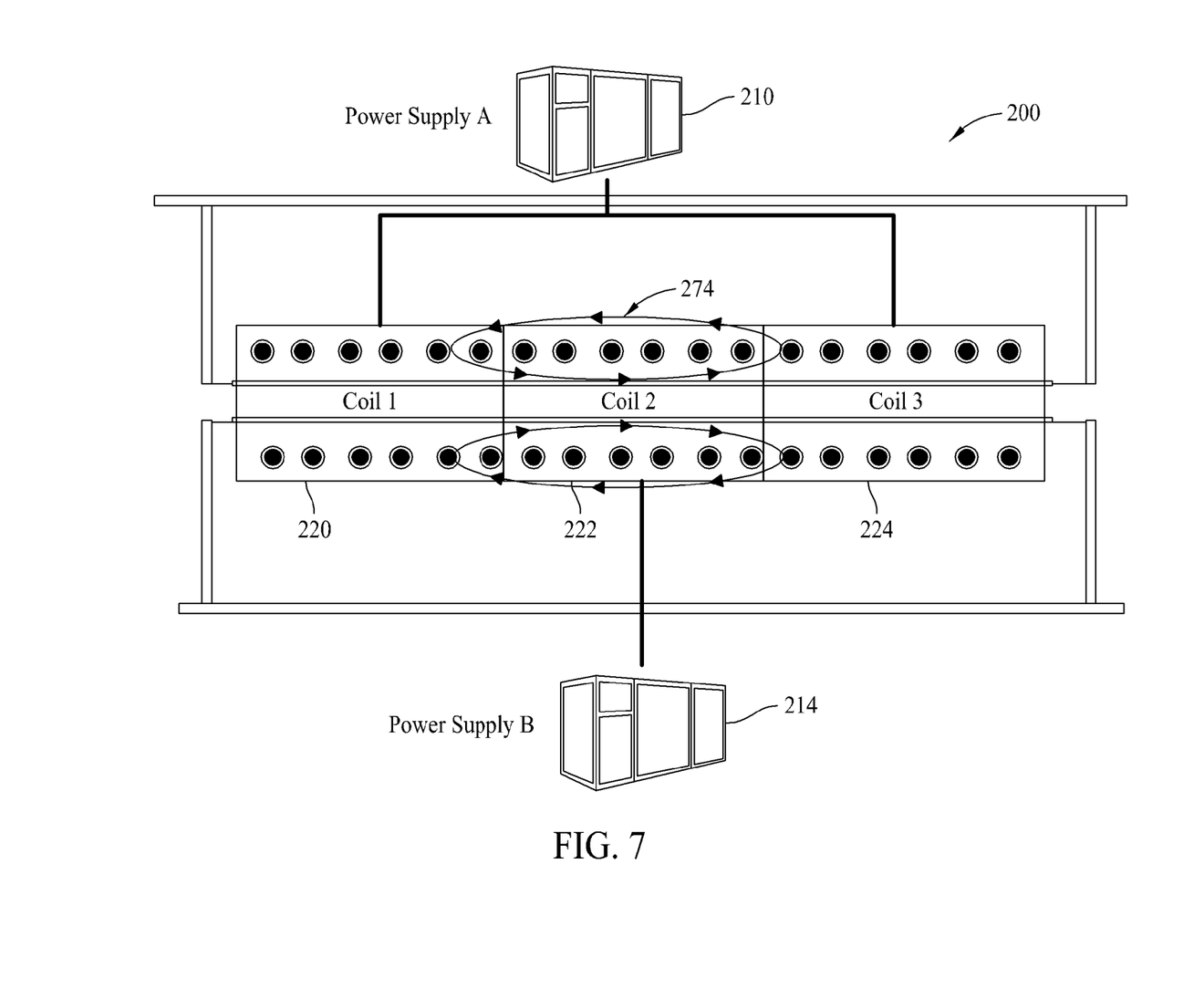
FIG. 7 is another expanded diagram of the portion of the exemplary embodiment of the system shown in FIG. 4.

FIG. 7 is an expanded diagram of the portion of the exemplary embodiment of system 200 shown in FIG. 6. An electromagnetic field 274 is produced by second coil 222 when second coil 222 is energized by third power supply 214.

In the exemplary embodiment, system 200 (shown in FIGS. 4, 5, and 6) facilitates reducing electromagnetic interference between adjacent coils by selectively energizing coils 220, 222, 224, 226, 228, 230, 232, 234, 236, 238, 240, and 242. In other words, use of multiple individual coils 220, 222, 224, 226, 228, 230, 232, 234, 236, 238, 240, and 242 positioned adjacent to one another to define process area 244 facilitates energizing adjacent coils at different times. The coils 220, 222, 224, 226, 228, 230, 232, 234, 236, 238, 240, and 242 are alternately turned "on" and "off" to ensure the electromagnetic field 270 produced by one coil does not adversely affect the electromagnetic field 274 produced by an adjacent coil. For example, in the exemplary embodiment, first power supply 210 provides electricity to coils 220, 224, and 228 at times when third power supply 214 is not providing electricity to coils 222, 226, and 230. The timing of supplying electricity to coils 220, 222, 224, 226, and 228 facilitates reducing electromagnetic interference between electromagnetic fields 270, 272, and 274 (shown in FIGS. 6 and 7). Additionally, third power supply 214 provides electricity to coils 222, 226, and 230 at times when first power supply 210 is not providing electricity to coils 220, 224, and 228. Second and third power supplies 212 and 216 operate in the same manner.

Similarly, in the exemplary embodiment, third power supply 214 provides power to coils 222, 226, and 230 at alternate times than second power supply 212 provides power to coils 232, 236, and 240 in order to prevent electromagnetic interference between coils 230 and 232. In the exemplary embodiment, prevention of interference between the electromagnetic fields produced by coils 230 and 232 may be facilitated by configuring first power supply 210 and second power supply 212 to turn the corresponding coils "on" and "off" at the same time, and configuring third power supply 214 and fourth power supply 216 to turn the corresponding coils "on" and "off" opposite to first and second power supplies 210 and 212.

The above described control scheme for powering coils 220, 222, 224, 226, 228, 230, 232, 234, 236, 238, 240, and 242 facilitates driving the temperature of a smart susceptor, for example, susceptor 252, and the part up to the Curie point of the susceptor 252 and holding the temperature so consolidation can occur. Various system configurations, including, varying the number of turns versus the number of coils versus the number of power supplies, changing frequencies and/or susceptor thicknesses, and varying the lengths of time of each power supply is held "on" and "off," may be combined to create the desired processing capability. In an example embodiment, first and second power supplies 210 and 212 provide electricity to the corresponding coils for approximately one-half second to ten seconds and do not provide electricity to the corresponding coils for approximately one to ten seconds. In another exemplary embodiment, first and second power supplies 210 and 212 provide electricity for approximately one-half second to thirty seconds and do not provide electricity for one to thirty seconds. As described above, when first and second power supplies 210 and 212 are not powering coils 220, 224, 228, 232, 236, and 240, third and fourth power supplies 214 and 216 are powering coils 222, 226, 230, 234, 238, and 242, and vice versa. The time ranges above are given as examples only, and any time ranges may be used that allow system 200 to function as described herein.

Figure 8:
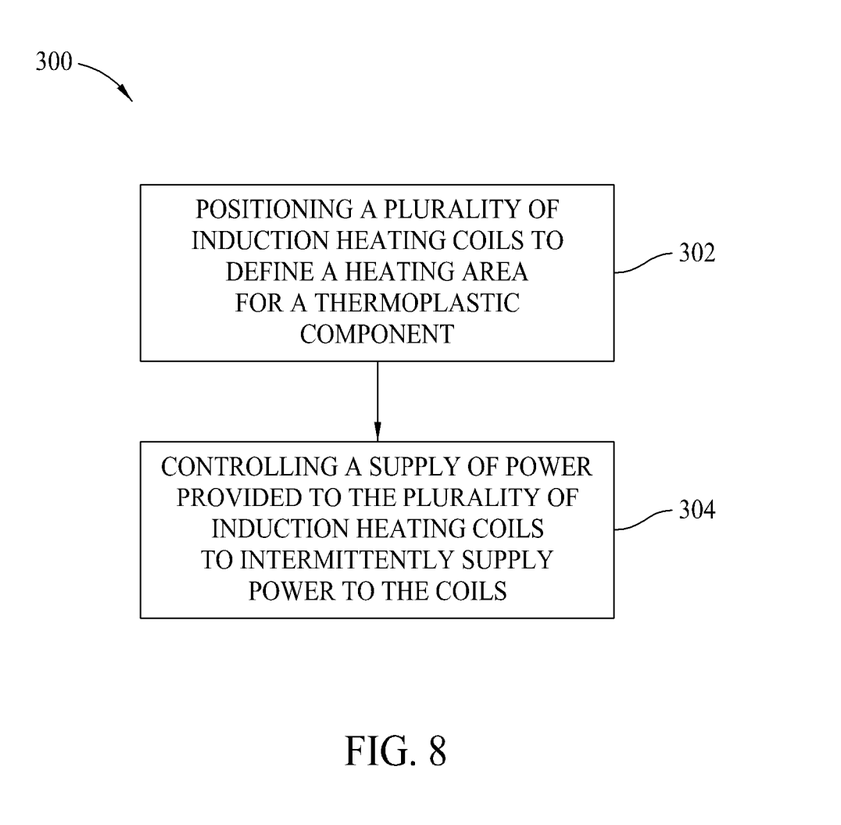
FIG. 8 is a flowchart illustrating an exemplary method for production of thermoplastic components using induction heating.

FIG. 8 is a flowchart 300 of an exemplary method for production of thermoplastic components using induction heating. The exemplary method includes positioning 302 a plurality of induction heating coils to define a process area for a thermoplastic component. The plurality of induction heating coils includes a first set of coils and a second set of coils. The exemplary method also includes controlling 304 a supply of electricity provided to the plurality of inductive heating coils to intermittently activate the coils to facilitate prevention of electromagnetic interference between adjacent coils. Positioning 302 the plurality of induction heating coils further includes positioning the plurality of coils such that coils of the first set of coils and coils of the second set of coils alternate along the length of the process area.

Controlling 304 the supply of electricity provided to the plurality of induction heating coils further includes controlling a supply of power provided to the first set of coils independently from the supply of power provided to the second set of coils. The first set of coils are supplied with power when power is not supplied to the second set of coils, and power is provided to the second set of coils when power is not provided to the first set of coils. As described above, a first power supply provides electricity to the first set of coils and a second power supply provided electricity to the second set of coils.

The above described system of positioning individual coils in sequence and connecting them to a set of independent power supplies that can energize individual coils (or sets of coils), allows the coil sizes to remain relatively small compared to the size of the components to be produced. Furthermore, the above described system facilitates rapid fabrication of large composite structures to meet accelerated production rates without increasing a number of apparatuses and tooling. Induction heating with susceptors, in combination with the above described system of supplying electromagnetic fields to the susceptors, reduces the extended thermal cycle inherent in standard autoclave processing systems.

The above described induction consolidation system eliminates the need to heat the tool, which facilitates rapid heating and cooling cycles while maintaining a consistent and controlled processing temperature. By eliminating the long heating and cooling cycles typical of the autoclave cycles, a rate insensitive process for large scale thermoplastic composite structures is facilitated.

The above described system enables the application of induction processing to the consolidation of large thermoplastic composite components such as wing skins and wind turbine blades. In addition, it enables the utilization of higher performing thermoplastic resins and a rapid method for fabricating these components, which facilitates reducing the large inventory and capital issues associated with autoclave production.

The above described system provides a cost effective solution for consolidation of large thermoplastic composite structures that enables improved performance and cost savings. Furthermore, the above described system facilitates fabrication of large thermoplastic components without the use of traditional fasteners, which reduces a component count. The use of induction heating facilitates a reduction in surface preparation, in many cases, necessitating only a solvent wipe to remove surface contaminants. Furthermore, the above described system facilitates: use of materials that have an indefinite shelf life at room temperature, short process cycle time (e.g., typically measured in minutes), enhanced joint performance, especially hot/wet and durability, and rapid field repair of composites or other structures. In addition, components fabricated using the above described system show little or no loss of bond strength after prolonged exposure to environmental influences.

Exemplary embodiments of systems and methods for fabricating thermoplastic components using induction heating are described above in detail. The systems and methods are not limited to the specific embodiments described herein, but rather, components of systems and/or steps of the method may be utilized independently and separately from other components and/or steps described herein. The exemplary embodiments can be implemented and utilized in connection with other fabrication applications.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inductive heating apparatus for fabricating a thermoplastic component, said apparatus comprising:
   a first set of induction coils;
   a second set of induction coils, said first and second sets of induction coils positioned to define a process area for the thermoplastic component, wherein said process area extends through at least one coil of said first and second sets of induction coils, wherein individual coils of said second set of induction coils are positioned between a pair of individual coils of said first set of induction coils along a length of the process area;
   at least one first power supply; and
   at least one second power supply, said at least one first power supply coupled to said first set of induction coils, and said at least one second power supply coupled to said second set of induction coils, said first and second power supplies configured to alternately supply electricity to said first set of induction coils and said second set of induction coils to facilitate reducing electromagnetic interference between individual coils of said first and second sets of induction coils, wherein said first power supply is configured to provide said first set of induction coils with electricity for a first predetermined period of time while said second power supply is not supplying electricity to said second set of coils, and said second power supply is configured to provide said second set of induction coils with electricity for a second predetermined period of time when said first power supply is not providing electrcity to said first set of induction coils.

2. The apparatus in accordance with claim 1, wherein said first and second predetermined periods of time is from approximately one-half second to ten seconds.

3. The apparatus in accordance with claim 1, wherein said first and second predetermined periods of time is from approximately one-half second to thirty seconds.

4. The apparatus in accordance with claim 1, wherein said process area is configured to be positioned adjacent to a thermoplastic composite preform positioned within a metal susceptor envelope.

5. A system for fabricating a thermoplastic component using induction heating, said system comprising:
   a thermoplastic composite preform;
   a susceptor;
   a first set of induction coils and a second set of induction coils positioned adjacent to said thermoplastic preform, wherein individual coils of said second set of induction coils are positioned between a pair of individual coils of said first set of induction coils to define a thermoplastic component process area, wherein said thermoplastic component process area extends through at least one of said individual coils of said first and second sets of induction coils; and
   at least one first power supply and at least one second power supply, said first power supply coupled to said first set of induction coils, and said second power supply coupled to said second set of induction coils, said first and second power supplies configured to alternately power said first set of induction coils and said second set of induction coils such that said first and second sets of induction coils are energized at different times to facilitate reducing electromagnetic interference between individual coils of said first and second sets of induction coils.

6. The system in accordance with claim 5, wherein said thermoplastic composite preform is positioned within said susceptor.

7. The system in accordance with claim 5, wherein said susceptor is surrounded by said thermoplastic composite preform.

8. The system in accordance with claim 5, wherein said first power supply is configured to power said first set of induction coils for a first predetermined period of time while said second power supply is not powering said second set of coils, and said second power supply is configured to power said second set of induction coils for a second predetermined period of time when said first power supply is not powering said first set of induction coils.

9. The system in accordance with claim 8, wherein said first and second predetermined periods of time is from approximately one-half second to ten seconds.

10. The system in accordance with claim 8, wherein said first and second predetermined periods of time is from approximately one-half second to thirty seconds.

11. The system in accordance with claim 5, wherein said first set of induction coils and said second set of induction coils are configured to produce electromagnetic fields at alternating times.

12. An inductive heating apparatus for fabricating thermoplastic aircraft components, said apparatus comprising:
 a first set of induction coils made up of a plurality of individual coil segments, said first set of induction coils coupled to at least one first power supply;
 a second set of induction coils made up of a plurality of individual coil segments, said first and said second set of induction coils positioned to define a process area for the thermoplastic component, wherein said process area extends through at least one of said coil segments of said first and second sets of induction coils, wherein individual coils of said second set of induction coils are positioned between a pair of individual coils of said first set of induction coils along a length of the process area; said second set of induction coils coupled to at least one second power supply; and
 said at least one first power supply configured to provide said first set of induction coils with electricity for a first predetermined period of time while said at least one second power supply is not supplying electricity to said second set of induction coils, said second power supply configured to provide said second set of induction coils with electricity for a second predetermined period of time when said first power supply is not providing electricity to said first set of induction coils.

13. The inductive heating apparatus of claim 12, wherein said first and second predetermined periods of time is from approximately one-half second to thirty seconds.

* * * * *